Aug. 14, 1923.

S. A. GUTMAN

METHOD OF PRODUCING LOCK HANDLES

Original Filed Jan. 16, 1922

1,464,526

INVENTOR
S. A. Gutman.
BY
C. F. Heinkel,
ATTORNEY

Patented Aug. 14, 1923.

1,464,526

UNITED STATES PATENT OFFICE.

SYLVESTER A. GUTMAN, OF FLINT, MICHIGAN.

METHOD OF PRODUCING LOCK HANDLES.

Original application filed January 16, 1922, Serial No. 529,484. Divided and this application filed May 5, 1922. Serial No. 558,821.

*To all whom it may concern:*

Be it known that I, SYLVESTER A. GUTMAN, a citizen of the United States, and resident of Flint, county of Genesee, and State of Michigan, have invented a new and useful Method of Producing Lock Handles (being a division of my application for patent filed Jan. 16, 1922, Serial Number 529,484), of which the following is a specification.

My invention relates to the production of lock handles generally, and to those having a loose member particularly.

The object of my invention is an economical method of producing lock handles.

Figure 1:
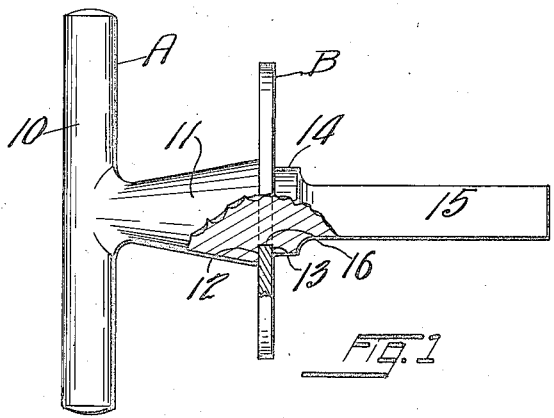
Figure 2:
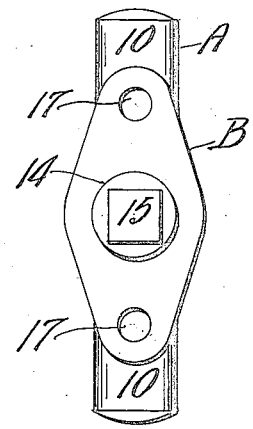
Figure 3:
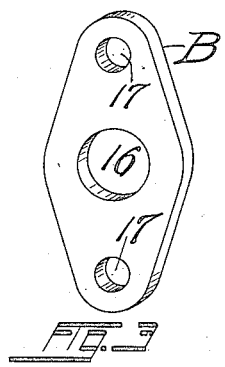
Figure 4:
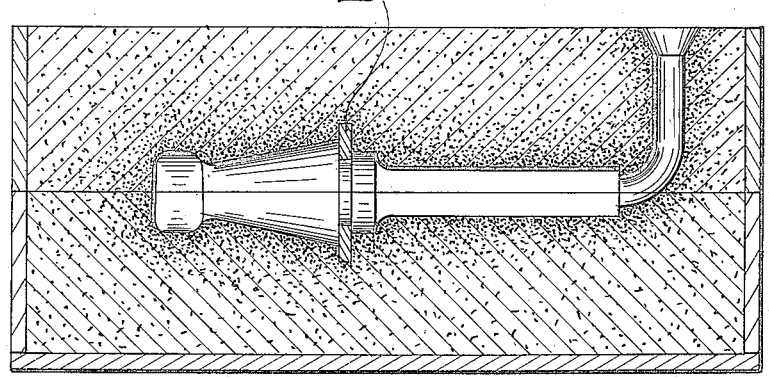
Figure 5:
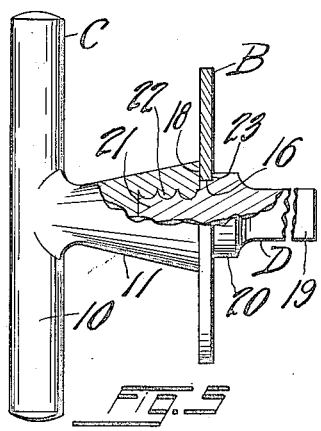
Figure 6:
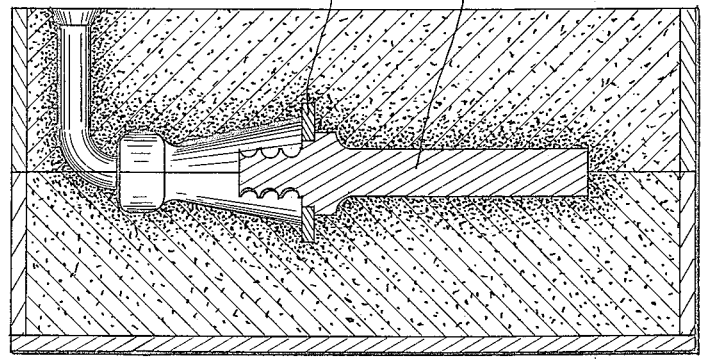

I attain this object by the procedure hereinafter described and shown, in one exemplification, in the accompanying drawing in which Fig. 1 is a general side view of a lockhandle produced according to the present invention, partly broken away to show the relation between the casting and the loose member; Fig. 2 is an end view of Fig. 1; Fig. 3 is a perspective view of the loose member; Fig. 4 is a general section of a mold ready for casting the lockhandle shown in Figs. 1 and 2; Fig. 5 is a general side view of a modified lockhandle, partly broken away to show the relations between the casting and the other members, and Fig. 6 is a general section of a mold ready for casting the lockhandle shown in Fig. 5.

Similar reference characters refer to similar parts throughout the views.

The present invention produces an article which has all of the qualities necessary for an article of the character shown, which has no mechanically connected parts, and in which a movable member can perform its function as in built up articles of the same character.

The drawing shows the present invention embodied in a lockhandle such as is commonly used on automobile doors.

The lockhandles of the present construction are composed of several parts mechanically secured to each other. Such construction requires considerable machine work, fitting, and assembling, all of which is not only expensive but also produces an article which is not durable since the joints between the several parts become loose due to the constant operation of the lockhandle.

The lockhandle, shown in Figs. 1 and 2, is composed of the body A and the rotatable insert or plate B.

The body A is made of cast metal in a manner which will be described presently and is composed of the handle 10, the neck 11, the shoulders 12 and 13, the collar 14, and the square or key portion 15 which is adapted to enter and operate a lock.

The member B is, preferably, made of material of a tough nature, not brittle, and, preferably, formed oblong as shown in Fig. 3, and is provided with the central opening 16 and the openings 17 which receive screws whereby the part B is fastened to the lock or other support as on an automobile door for instance.

When this lockhandle is applied in practice, the member B becomes the stationary member and the body A is journaled therein.

In order to produce these articles in the most economical manner, they must be produced in quantities and by elimination of all possible work and parts which is accomplished by the novel method of casting hereinafter described and by the construction of the member B which must be fastened to either flat or irregularly formed surfaces and is, therefore, made of flat and rather thin and tough material so that it may be bent to suit any contour upon which it may be fastened. With the present invention, the member B can be made of one form for all locks whereby considerable expense of dies and tools, as well as production cost, is eliminated.

Since it is necessary that the member A rotate in the member B and that the member A must hold the member B in position longitudinally without additional mechanical or auxiliary means, special provisions must be made when casting the body A.

A preferred method of so casting the body A consists of making a pattern which conforms to the outline of the entire lockhandle as shown in Figs. 1 and 2. Then make a mold with this pattern in the usual manner well known in foundry practice. After the pattern is removed from the mold, the member B is placed into this mold similar to a core in an ordinary casting which procedure is also well known in foundry practice. A section of the mold, at this stage of the proceeding, is shown in Fig. 4. Then pour molten metal into this mold whereupon, after cooling, the member B is held longitudinally on the body A by the shoulders 12 and 13.

Usually, after the member A is so cast, the member B can rotate thereon due to the fact that the cast metal in the opening 16 shrinks away from the wall of this opening and permits such rotation; and the distance between the shoulders 12 and 13 is so short that the shrinkage therebetween amounts to very little.

In some instances it may be found that the member B does stick to the body A after casting. This condition is not serious and is readily overcome by forcibly rotating the member B on the member A a few times which operation relieves the members and provides a working clearance.

This tendency of sticking may also be overcome by applying a relieving agent, such as graphite, on the wall of the opening 16 and on the sides of the member B adjacent this opening before it is placed in the mold. This relieving agent will prevent the metal of the body A from sticking to the member B and will provide the necessary working clearance between the members A and B.

Since the square portion 15 is subject to considerable wear in most instances, and since the handle 10 and the neck 11 are, preferably, made of soft material, the square portion 15 may be made of material harder than the other parts which material may also have the property of being hardened.

Such an arrangement is shown in Figs. 5 and 6 where the lockhandle consists of the body C, the end D, and the loose member B which is a duplicate of the one shown in Fig. 3 and described in connection with Figs. 1 and 2.

The body C is cast similar to the body A previously described and has the handle 10, the neck 11, and the shoulder 18.

The end D has the square portion 19, the collar 20, the projection 21 provided with corrugations 22, and the shoulder 23.

This end D is made of rather hard material, preferably of a ferro base or such material which can be hardened, and may be made economically either by the drop forge or casting process and the end 19 may be hardened if desired.

The method of producing this lockhandle is similar to the one previously described except that the end D is also placed into the mold similar to a core. Fig. 6 shows a section through such a mold with the members B and D in position and ready for pouring the molten metal.

After casting, the neck 11 will firmly shrink upon the projection 21 since the material of the neck 11 completely surrounds this projection and firmly holds the end D to the handle C due to the corrugations, while the member B will rotate on the projection 21 and will be held in position longitudinally by the shoulders 18 and 23.

This last method, like the first one, also produces a one piece body since the portions thereof are united in such a manner that they can not be separated without destroying one or the other of the elements.

In case sticking is encountered between the members B and C or D, the same can be remedied by the expedients previously pointed out.

It will be seen that the present invention provides an inexpensive, simple, and efficient method of producing lock handles and is a decided step to advance the art.

The illustration shown and described is only an exemplification of the present invention and is susceptible to modifications as to method and application within the scope of the claims.

Therefore, without limiting myself to the precise steps and articles shown and described,

I claim:—

1. The method of producing a lock handle having a handle member and a wear member and a support plate, which method consists in forming said support plate and providing an opening therein, forming a mold with a core print for said support plate and with a cavity conforming to said handle member and to said wear member and to a shoulder against each side of said support plate, placing said support plate into said core print, filling said mold with molten metal, permitting said molten metal to cool whereby said shoulders shrink lightly upon the sides of said support plate and the material in said opening of said support plate shrinks away from the wall of said opening, and forcibly rotating said support plate on said handle to provide free rotation thereof without end play of said support plate between said shoulders.

2. The method of producing a composite structure having a rotatable member and a wear member, which method consists in forming said rotatable member with an opening therein, forming said wear member with a corrugated end, forming a mold conforming to the contour of the structure, placing said rotatable member into said mold, placing said wear member into said mold with said corrugated end projecting into the cavity thereof, filling said mold with molten metal completely surrounding said corrugated end and filling said opening, removing the structure from said mold after cooling, and forcibly rotating said rotatable member to provide working clearance therefor without end play thereof.

3. The method of producing a composite structure having a rotatable member and a fixed member, which method consists in forming said rotatable member, forming said said fixed member with a corrugated end, forming a mold conforming to the contour of the structure, placing said rotatable member into said mold, placing said fixed member into said mold with said corrugated end projecting into the cavity thereof, filling said mold with molten metal to form the body fixedly upon said fixed member and semi-fixedly in said rotatable member, and forcibly rotating said rotatable member to provide working clearance therefor without end play thereof.

SYLVESTER A. GUTMAN.